US007101958B2

(12) United States Patent
Gloeckner et al.

(10) Patent No.: US 7,101,958 B2
(45) Date of Patent: Sep. 5, 2006

(54) KETONE-ALDEHYDE RESINS HAVING LOW WATER CONTENT, HIGH THERMAL STABILITY AND YELLOWING RESISTANCE

(75) Inventors: Patrick Gloeckner, Ratingen (DE); Werner Andrejewski, Dorsten (DE); Hans-Peter Bergmann, Marl (DE); Iris Brueckner, Dorsten (DE); Peter Denkinger, Nottuln (DE); Michael Ewald, Marl (DE); Thomas Weber, Dortmund (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/893,241

(22) Filed: Jul. 19, 2004

(65) Prior Publication Data
US 2005/0043499 A1    Feb. 24, 2005

(30) Foreign Application Priority Data
Aug. 22, 2003   (DE)  ................ 103 38 561

(51) Int. Cl.
*C08G 2/00*   (2006.01)
(52) U.S. Cl. ............... 528/222; 528/224; 528/227; 528/223; 525/399
(58) Field of Classification Search ........... 528/222, 528/224, 227, 223; 525/399
See application file for complete search history.

(56) References Cited

U.S. PATENT DOCUMENTS 3,913,238 A * 10/1975 Updegrove ............... 34/380
4,023,279 A *  5/1977 Janda ....................... 34/265
4,731,434 A *  3/1988 Dorffel ..................... 528/227

FOREIGN PATENT DOCUMENTS

| DE | 1 300 256  | 7/1969 |
| DE | 28 31 613  | 1/1980 |
| DE | 33 24 287  | 1/1985 |
| EP | 0 668 301  | 8/1995 |

OTHER PUBLICATIONS

Engelhardt et al., STN AN 1969:482022, abstracting DE 1300256.*
Engelhardt et al.,DERWENT Abstract 1968-31952Q, abstracting DE 1300256.*
U.S. Appl. No. 10/922,909, filed Aug. 23, 2004, Andrejewski, et al.
U.S. Appl. No. 10/893,241, filed Jul. 19, 2004, Gloeckner, et al.

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

The invention described herein provides ketone-aldehyde resins, especially cyclohexanone-formaldehyde resins, with low water content and high thermal stability and yellowing resistance, and to a process for preparing them and their use.

39 Claims, No Drawings

KETONE-ALDEHYDE RESINS HAVING LOW WATER CONTENT, HIGH THERMAL STABILITY AND YELLOWING RESISTANCE

BACKGROUND OF THE INVENTION

1. Field of the Invention

The invention relates to ketone-aldehyde resins, especially cyclohexanone-formaldehyde resins, with low water content and high thermal stability and yellowing resistance, and to a process for preparing them and their use.

2. Description of the Background

It is known that ketones or mixtures of ketones and aldehydes can be reacted in the presence of basic catalysts or acids to form resinous products. Thus mixtures of cyclohexanone and methylcyclohexanone can be used to prepare resins (Ullmann Vol. 12, p. 551). Cyclohexanone and formaldehyde react to form hard resins which are used in the coatings industry.

Processes for preparing products of this kind are described in, for example, U.S. Pat. No. 2,540,885, U.S. Pat. No. 2,540,886, DD 12433, DE 13 00 256, DE 28 31 613, DD 123481 and DE 12 56 898.

The resins obtained in accordance with the various processes possess softening points, as apparent from an overview given in DD 123481, of up to 120° C.

DD 12433 describes a process for preparing gritlike products by addition of small amounts of swelling agents and thickeners or surface-active substances as dispersing assistants. Some or all of these additives may remain in the products, and consequently may have adverse effects on properties such as the water resistance of coatings from coating materials manufactured with the products. The skilled worker is also aware that the proportion of water in gritlike products is relatively high, since there may be water inclusions in the grit particles.

According to DD 123481 and DE 12 56 898 it is possible to obtain resins having softening points of up to 160° C. The processes described, however, are costly and inconvenient.

According to DE 28 31 613 polycondensation products are obtained from aliphatic or cyclic ketones or mixtures of these ketones with aliphatic aldehydes in the presence of basic catalysts, using from 0.005 to 10 mol %, based on the total amount of ketone and aldehyde, of a phase transfer catalyst. If the process disclosed therein is used to prepare a resin having a composition which corresponds to the present invention, high softening points and hence high molecular weights are obtained. Since the resins to which the invention relates are used, inter alia, in the coatings industry in order to reduce the solvent fraction, such high molecular weights are especially disadvantageous. The skilled worker is also aware that too high a molecular weight is detrimental to the broad solubility properties of cyclohexanone-formaldehyde resins. The skilled worker is further aware that resins, in accordance with the process disclosed therein, possess low nonvolatile fractions, as a result of which the thermal stability may be adversely affected and the yields of the process described are low.

DE 12 56 898 and U.S. Pat. No. 2,540,885 describe processes for preparing condensation products in the presence of inert solvents. The process on which the present invention is based succeeds without such additions, thereby obviating expensive reprocessing of said solvent and, for a given reactor size, allowing the use of greater quantities of reactants, so that higher conversions are achieved. The skilled worker is aware that resins, in accordance with the process described in U.S. Pat. No. 2,540,886, are obtained in low yields.

DE 13 00 256 describes a process for purifying ketone-formaldehyde resins. If the conditions there are applied to the cyclohexanone and formaldehyde condensation products of the invention the resultant resins, particularly as a 10% strength solution in xylene, contain an insoluble precipitate.

JP 47018866 adds an anhydride to a resin to obtain a low-water-content resin which can find use in polyurethane applications. The products of the invention have a low water content, suitable for polyurethane applications, without the addition of further substances.

JP 46004998 uses phenols in order to enhance the light stability and heat resistance of cyclohexanone-formaldehyde resins. The resins prepared by the process of the invention are stable without such additives.

At the present time a variety of cyclohexanone-formaldehyde resins are available on the market. The products differ primarily in their softening point (from 75–120° C.) and in their OH number (from 80–260 mg KOH/g).

Common to all these products is a fairly high water content of between 0.4% and 2.5% by weight. The high water content of the standard commercial products prevents their use in high-grade coating materials such as 2-component polyurethane varnishes, for example.

A further disadvantage of the standard commercial products is that solutions of these resins in aromatic solvents such as, say, xylene tend toward clouding owing to the high water content. These products are unsuitable for applications which use, for example, long-oil alkyd resins.

Furthermore, the resins presently available on the market possess a relatively low temperature stability, and so can be used only to a limited extent, if at all, in baking systems.

SUMMARY OF THE INVENTION

The object on which the present invention was based was to eliminate the aforementioned disadvantages of the commercial products and to find resins which possess a low water content, high thermal stability and yellowing resistance and which are soluble in alcoholic and aromatic solvents. Additionally the nonvolatiles content ought to be high.

The intention was further to find a process for preparing ketone-aldehyde resins, especially cyclohexanone-formaldehyde resins, with which, on economic grounds, it would be possible to obtain yields above 92%.

Surprisingly, it has proved possible to achieve this object by using a phase transfer catalyst for the resin synthesis and by adding the required amount of aldehyde in portions.

Thus, the present invention provides ketone-aldehyde resins having a water content of less than 0.4% by weight, where the resin is obtained by condensing at least one ketone with at least one aldehyde in the presence of I. at least one alkali metal compound and II. at least one phase transfer catalyst in the absence of solvent or using a water-miscible organic solvent, such as methanol or ethanol, the addition of the aldehyde being made 1. by means of an initial charge at the beginning of the condensation and 2. in at least one further substep following initiation of condensation in stage 1.

Accordingly, the present invention relates to a ketone-aldehyde resin having a water content of less than 0.4% by weight, obtained by condensing at least one ketone with at least one aldehyde in the presence of at least one alkali metal compound and at least one phase transfer catalyst in the absence of solvent or in a water-miscible organic solvent, wherein the aldehyde is added (1) in an initial charge at the beginning of the condensation and (2) in at least one further substep following initiation of condensation in (1).

The present invention also provides a process for making the ketone-aldehyde resin as described above.

The present invention also provides compositions which contain the ketone-aldehyde resin described herein.

DETAILED DESCRIPTION OF THE INVENTION

The invention provides with preference ketone-aldehyde resins where stage 2 is performed in two further substeps.

Great preference is given to ketone-formaldehyde resins obtained by condensing at least one ketone with at least one aldehyde prepared in the presence of I. from 0.05 to 10 mol % (based on the ketone employed) of at least one alkali metal compound and II. from 0.01 to 15% by weight (based on the ketone employed) of at least one phase transfer catalyst, where 1. from 2 to 40 mol % of the aldehyde are introduced at the beginning of the reaction, and 2. from 20 to 98 mol % of the aldehyde are supplied in a second step, and 3. from 0 to 40 mol %, preferably from 2 to 40 mol % of the aldehyde are added in a third step.

A further preferred subject of the invention are such cyclohexanone-formaldehyde resins.

The ketone-aldehyde resins on which the invention is based possess a low water content and are therefore suitable for use in high-grade coating materials such as 2-component polyurethane varnishes, for example. Furthermore, as a result of the process, the resins are soluble in alcoholic and aromatic solvents, and so are suitable for applications in which, for example, long-oil alkyd resins are used.

As noted above, the water content of the resin is less than 0.4% by weight. In preferred embodiments, the water content may be less than 0.3, 0.2 or 0.1% by weight.

The resins of the invention have only a slight tendency toward yellowing during thermal exposure. Moreover, the products of the invention possess a high nonvolatiles content and are therefore suitable for low-VOC applications.

It has also been found, surprisingly, that it is possible to vary the hydroxyl numbers of the resins within wide ranges.

The yields of the process on which the invention is based are more than 92%, preferably more than 94%, and, with particular preference, more than 96% of the theoretical yield.

The resins of the invention have the following properties:
solubility in alcohols, especially ethanol, and/or aromatics, especially xylene;
a water content below 0.4% by weight, in particular 0.3% by weight;
a high temperature stability, i.e., low yellowing tendency during thermal exposure;
a nonvolatiles fraction of more than 99% by weight (1 h, 160° C.);
a glass transition temperature of between 10 and 110° C., preferably between 50 and 90° C., more preferably between 60 and 85° C.;
a hydroxyl number of between 0 and 300 mg KOH/g.

Ketones

Ketones suitable for the ketone-aldehyde resins of the invention include all ketones, particularly acetone, acetophenone, methyl ethyl ketone, 2-heptanone, 3-pentanone, methyl isobutyl ketone, cyclopentanone, cyclododecanone, mixtures of 2,2,4- and 2,4,4-tri-methylcyclopentanone, cycloheptanone, and cyclooctanone, cyclohexanone and all alkyl-substituted cyclohexanones having one or more alkyl radicals containing in total from 1 to 8 carbon atoms, individually or in a mixture. Examples of alkyl-substituted cyclohexanones include 4-tert-amylcyclohexanone, 2-sec-butylcyclohexanone, 2-tert-butylcyclohexanone, 4-tert-butylcyclohexanone, 2-methylcyclohexanone, and 3,3,5-trimethylcyclohexanone.

In general, however, it is possible to use any ketones said in the literature to be suitable for ketone resin syntheses. Preferred ketone-formaldehyde resins are those based on cyclohexanone alone or together with acetophenone, 4-tert-butylcyclohexanone and 3,3,5-tri-methylcyclohexanone, methyl ethyl ketone, and heptanone.

Aldehydes

Suitable aldehyde components include in principle branched or nonbranched aldehydes, such as formaldehyde, acetaldehyde, n-butyraldehyde and/or isobutyraldehyde, valeraldehyde, and dodecanal, etc., though preference is given to formaldehyde alone or in mixtures. In general, however, it is possible to use any aldehydes said in the literature to be suitable for ketone resin syntheses. Formaldehyde, which is preferred, is normally employed in the form of an aqueous or alcoholic solution (e.g., in methanol or butanol) with a concentration of from about 20 to 40% by weight. Other forms of formaldehyde, such as para-formaldehyde or trioxane, for example, are likewise possible. Aromatic aldehydes, such as benzaldehyde, may likewise be present in a mixture with formaldehyde.

Alkali Metal Compound

The reaction is conducted in a basic medium. In general it is possible to use any basic compound said in the literature to be suitable for ketone resin syntheses. Preference is given to hydroxides, for example, of the cations $NH_4$, $NR_4$, Li, Na, and K.

Phase Transfer Catalyst

In the polycondensation mixture, from 0.01 to 15% by weight—based on the ketone of a phase transfer catalyst of the general formula (A)

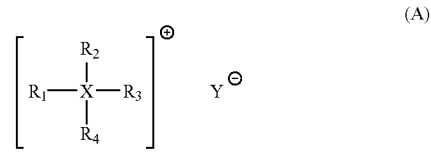

(A)

are used, where

X is a nitrogen or phosphorus atom, $R_1$, $R_2$, $R_3$, and $R_4$ can be identical or different and are an alkyl radical having 1 to 22 carbon atoms in the carbon chain and/or a phenyl radical and/or a benzyl radical, and Y is the anion of an (in)organic acid or a hydroxide ion.

Preferred alkyl radicals ($R_{1-4}$) for quaternary ammonium salts are those having 1 to 22 carbon atoms, especially those having 1 to 12 carbon atoms, in the carbon chain and/or phenyl radicals and/or benzyl radicals and/or mixtures of both. Preference is given to using benzyltributylammonium chloride, cetyldimethylbenzylammonium chloride and/or triethylbenzylammonium chloride. For quaternary phosphonium salts, alkyl radicals having 1 to 22 carbon atoms and/or phenyl radicals and/or benzyl radicals are preferred for $R_{1-4}$. Suitable anions are those of strong (in)organic acids, such as $Cl^-$, $Br^-$, and $I^-$, for example, and also hydroxides, methoxides or acetates.

Examples of quaternary ammonium salts are cetyldimethylbenzylammonium chloride, tributylbenzyl-ammonium chloride, trimethylbenzylammonium chloride, trimethylbenzylammonium iodide, triethylbenzylammonium chloride or triethylbenzylammonium iodide, tetramethyl-ammonium chloride, tetraethylammonium chloride, and tetrabutylammonium chloride. Examples of suitable quaternary phosphonium salts include triphenylbenzylphosphonium chloride and triphenylbenzylphosphonium iodide. Mixtures, however, can also be used.

The phase transfer catalyst is used in amounts of from 0.01 to 15%, preferably from 0.1 to 10.0%, and in particular in amounts of from 0.1 to 5.0% by weight—based on the ketone employed—in the polycondensation mixture.

Solvent

The reaction can be conducted using an auxiliary solvent. Those which have proven suitable include alcohols such as methanol and ethanol, for example. It is also possible to use water-soluble ketones as auxiliary solvents, which then are also incorporated into the resin by reaction.

The invention also provides a process for preparing ketone-aldehyde resins having a water content of less than 0.4% by weight, obtained by condensing at least one ketone with at least one aldehyde in the presence of I. at least one alkali metal compound and II. at least one phase transfer catalyst in the absence of solvent or using a water-miscible organic solvent such as methanol or ethanol, for example, the addition of the aldehyde being made 1. by means of an initial charge at the beginning of the condensation and 2. in at least one further substep following initiation of condensation in stage 1.

The invention is a process for which stage 2 is performed two further substeps.

A process for preparing ketone-formaldehyde resins obtained by condensing at least one ketone with at least one aldehyde prepared in the presence of I. from 0.05 to 10 mol % (based on the ketone employed) of at least one alkali metal compound and II. from 0.01 to 15% by weight (based on the ketone employed) of at least one phase transfer catalyst, where 1. from 2 to 40 mol % of the aldehyde are introduced at the beginning of the reaction, and 2. from 20 to 98 mol % of the aldehyde are supplied in a second step, and 3. from 0 to 40 mol %, preferably from 2 to 40 mol % of the aldehyde are added in a third step.

A further preferred subject of the invention is a process for preparing cyclohexanone-formaldehyde resins.

The ratio between the ketone component and the aldehyde component can vary from 1:0.9 to 1:4. A preferred ketone/aldehyde ratio, however, is from 1:1 to 1:2.5. The ketone component and the aldehyde component can be added as they are or in solvents, as mentioned above, or in aqueous form. Particular preference is given to using an aqueous or alcoholic formaldehyde solution, trioxane and/or paraformaldehyde.

The invention likewise provides for the use of ketone-aldehyde resins having a water content of less than 0.4% by weight, obtained by condensation in the presence of I. at least one alkali metal compound and II. at least one phase transfer catalyst in the absence of solvent or using a water-miscible organic solvent such as methanol or ethanol, for example, the addition of the aldehyde being made 1. by means of an initial charge at the beginning of the condensation and 2. in at least one further substep following initiation of condensation in stage 1, as a main component, base component or additional component in coating compositions, printing inks, pigment pastes, tinting pastes, masterbatches, ballpoint pastes, inks, polishes, adhesives, sealants, and insulants, which dry physically or oxidatively, but especially with isocyanates and isocyanate derivatives and/or with amine resins as crosslinkers.

EXAMPLES

Having generally described this invention, a further understanding can be obtained by reference to certain specific examples which are provided herein for purposes of illustration only and are not intended to be limiting unless otherwise specified.

Preparation of a Resin

The resins are synthesized by charging 1 030 g of cyclohexanone, 210 g of an approximately 30% strength formaldehyde solution, 280 ml of methanol, and 3.8 g of benzyltributylammonium chloride to a three-necked flask with stirrer, reflux condenser, and temperature sensor under nitrogen. The reaction is initiated by adding 8.7 g of a 25% strength sodium hydroxide solution. The temperature of the batch is held below 60° C. by cooling. Then 1 350 g of an approximately 30% strength formaldehyde solution are added over the course of 100 minutes, followed by 25.2 g of a 25% strength sodium hydroxide solution. After stirring at reflux, 100 g of an approximately 30% strength formaldehyde solution are added and stirring at reflux is continued for 4 hours more. The stirrer is then switched off. Following phase separation, the supernatant aqueous methanol phase is separated off and the water/methanol mixture which remains is removed by distillation. The crude product is washed five times with water, 12 ml of acetic acid being added to the first wash water. Finally the product is distilled at up to 165° C. under a water jet vacuum.

Properties of the Resin

The resin obtained is colorless, clear, and brittle, soluble at 10% in ethanol, methyl ethyl ketone, acetone, ethyl acetate and xylene, and possesses a softening point of 106° C.

Gardner color number, 50% strength in ethyl acetate: 0.5

Hazen color number, 50% strength in ethyl acetate: 110

Karl-Fischer water content: 0.14% by weight

OHN=96 mg KOH/g, Tg=71° C.

$M_n$=650 g/mol, $M_w$=1 200 g/mol (polystyrene standard)

|  | 1 h at 120° C. | 1 h at 140° C. | 1 h at 160° C. |
| --- | --- | --- | --- |
| Color numbers[1] | 0.6 | 0.8 | 1.6 |
| Nonvolatiles content [% by wt.] | 99.8 | 99.6 | 99.5 |

[1] Gardner color numbers, 50% strength in ethyl acetate, of the resins in 100% form subjected to thermal exposure This application is based on German patent application No. 103 38 561.4, filed on Aug. 22, 2003, and incorporated herein by reference.

The invention claimed is:

1. A ketone-aldehyde resin having a water content of less than 0.4% by weight, obtained by condensing at least one ketone with at least one aldehyde in the presence of at least one alkali metal compound and at least one phase transfer catalyst in the absence of solvent or in a water-miscible organic solvent, wherein the aldehyde is added
   (1) in an initial charge at the beginning of the condensation; and
   (2) in at least one further substep following initiation of condensation in (1),
   wherein the ketone is selected from the group consisting of 4-tert-amylcyclohexanone, 2-sec-butylcyclohexanone, 2-tert-butylcyclohexanone, 4-tert-butylcyclohexanone, 2-methylcyclohexanone, 3,3,5-trimethylcyclohexanone, and mixtures thereof.

2. The ketone-aldehyde resin as claimed in claim 1, wherein (2) is performed in two substeps.

3. The ketone-formaldehyde resin as claimed in claim 1, prepared in the presence of
   from 0.05 to 10 mol %, based on the ketone, of at least one alkali metal compound and
   from 0.01 to 15% by weight, based on the ketone, of at least one phase transfer catalyst,
   wherein
   from 2 to 40 mol % of the aldehyde are introduced at the beginning of the reaction,
   from 20 to 98 mol % of the aldehyde are supplied in a second step, and
   from 0 to 40 mol % of the aldehyde are added in a third step.

4. The ketone-formaldehyde resin as claimed in claim 3, wherein from 2 to 40 mol % of the aldehyde are added in the third step.

5. The ketone-aldehyde resin as claimed in claim 1, wherein the aldehyde is selected from the group consisting of formaldehyde, acetaldehyde, n-butyraldehyde, isobutyraldehyde, valeraldehyde, dodecanal, and mixtures thereof.

6. The ketone-aldehyde resin as claimed in claim 1, wherein the condensing is conducted in the water-miscible solvent, which is an aqueous or alcoholic formaldehyde solution, trioxane and/or paraformaldehyde.

7. The ketone-aldehyde resin as claimed in claim 1, wherein the alkali metal compound comprises a hydroxide.

8. The ketone-aldehyde resin as claimed in claim 1, wherein the alkali metal compound is potassium hydroxide and/or sodium hydroxide.

9. The ketone-aldehyde resin as claimed in claim 1, wherein the phase transfer catalyst is an ammonium compound and/or a phosphonium compound.

10. The ketone-aldehyde resin as claimed in claim 9, wherein the phase transfer compound is represented by formula (A)

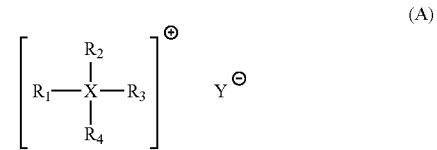

wherein
X is a nitrogen or phosphorus atom,
$R_1$, $R_2$, $R_3$, and $R_4$, are identical or different and are an alkyl radical having 1 to 22 carbon atoms in the carbon chain and/or a phenyl radical and/or a benzyl radical, and
Y is the anion of an (in)organic acid or a hydroxide ion.

11. The ketone-aldehyde resin as claimed in claim 10, wherein $R_1$, $R_2$, $R_3$, and $R_4$, are an alkyl radical having 1 to 12 carbon atoms in the carbon chain and/or phenyl radicals and/or benzyl radicals.

12. The ketone-aldehyde resin as claimed in claim 10, wherein $R_1$, $R_2$, $R_3$, and $R_4$ are an alkyl radical having 1 to 12 carbon atoms.

13. The ketone-aldehyde resin as claimed in claim 1, wherein the anion of the alkali metal compound comprises $Cl^-$, $Br^-$, $I^-$, hydroxide, methoxide, or acetate.

14. The ketone-aldehyde resin as claimed in claim 1, wherein the phase transfer catalyst is selected from the group consisting of cetyldimethylbenzylammonium chloride, tributylbenzylammonium chloride, trimethyl-benzylammonium chloride, trimethylbenzylanimonium iodide, triethylbenzylammonium chloride, triethylbenzylammonium iodide, tetramethylanimonium chloride, tetraethylammonium chloride, tetrabutylanimonium chloride and mixtures thereof.

15. The ketone-aldehyde resin as claimed in claim 1, wherein the condensing is conducted in a water-miscible alcohol and/or ketone.

16. The ketone-aldehyde resin as claimed in claim 15, wherein the condensing is conducted in methanol, ethanol, ethyl methyl ketone and/or acetone.

17. The ketone-aldehyde resin as claimed in claim 1, wherein the ketone comprises cyclohexanone and the aldehyde comprises formaldehyde.

18. The ketone-aldehyde resin as claimed in claim 1, which has the following properties:
   solubility in alcohols and/or aromatics;
   a water content below 0.4% by weight;
   a high temperature stability;
   a nonvolatiles fraction of more than 99% by weight (1 h, 160° C.);
   a glass transition temperature of between 10 and 110° C.; and
   a hydroxyl number of between 0 and 300 mg KOH/g.

19. The resin as claimed in claim 18, wherein said resin is prepared in the presence of
   from 0.05 to 10 mol %, based on the ketone employed, of at least one alkali metal compound and
   from 0.01 to 15% by weight, based on the ketone employed, of at least one phase transfer catalyst,
wherein
   from 2 to 40 mol % of the aldehyde are introduced at the beginning of the reaction,
   from 20 to 98 mol % of the aldehyde are supplied in a second step, and from 0 to 40 mol %, of the aldehyde are added in a third step.

20. A composition selected from the group consisting of coating compositions, printing inks, pigment pastes, tinting pastes, masterbatches, ballpoint pastes, inks, polishes, adhesives, sealants, and insulants which comprises:
the ketone-aldehyde resin of claim 1; and isocyanates and isocyanate derivatives as crosslinkers.

21. The composition as claimed in claim 20, which dries physically or oxidatively.

22. The composition as claimed in claim 20, which further comprises amine resins as crosslinkers.

23. The ketone-aldehyde resin as claimed in claim 1, wherein the basic compound comprises a hydroxide of the cations $NH_4$ or Li.

24. A process for preparing a ketone-aldehyde resin having a water content of less than 0.4% by weight, comprising condensing at least one ketone wilt at least one aldehyde in the presence of at least one alkali metal compound and at least one phase transfer catalyst in the absence of solvent or in a water-miscible organic solvent, wherein the aldehyde is added
(1) by an initial charge at the beginning of the condensation; and
(2) in at least one further substep following initiation of condensation in (1),
wherein the ketone is selected from the group consisting of 4-tert-amylcyclohexanone, 2-sec-butylcyclohexanone, 2-tert-butylcyclohexanone, 4-tert-butylcyclohexanone, 2-methylcyclohexanone, 3,3,5-trimethylcyclohexanone, and mixtures thereof.

25. The process as claimed in claim 24, wherein the phase transfer catalyst is represented by formula (A)

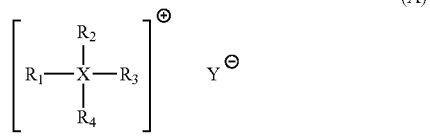

(A)

wherein
X is a nitrogen or phosphorus atom,
$R_1$, $R_2$, $R_3$, and $R_4$, are identical or different and are an alkyl radical having 1 to 22 carbon atoms in the carbon chain and/or a phenyl radical and/or a benzyl radical, and Y is the anion of an (in)organic acid or a hydroxide ion.

26. The process as claimed in claim 24, wherein the aldehyde is selected from the group consisting of formaldehyde, acetaldehyde, n-butyraldehyde, isobutyraldehyde, valeraldehyde, dodecanal, and mixtures thereof.

27. The process as claimed in claim 24, wherein the condensing is conducted in the water-miscible solvent, which is an aqueous or alcoholic formaldehyde solution, trioxane and/or paraformaldehyde.

28. The process as claimed in claim 24, wherein the basic compound comprises a hydroxide.

29. The process as claimed in claim 24, wherein the basic compound is potassium hydroxide and/or sodium hydroxide.

30. The process as claimed in claim 24, wherein the phase transfer catalyst is an ammonium compound and/or a phosphonium compound.

31. The process as claimed in claim 25, wherein $R_1$, $R_2$, $R_3$, and $R_4$ are an alkyl radical having 1 to 12 carbon atoms in the carbon chain and/or phenyl radicals and/or benzyl radicals.

32. The process as claimed in claim 25, wherein $R_1$, $R_2$, $R_3$, and $R_4$ are an alkyl radical having 1 to 12 carbon atoms.

33. The process as claimed in claim 24, wherein the anion of the basic compound comprises $Cl^-$, $Br^-$, $I^-$, hydroxide, methoxide, or acetate.

34. The process as claimed in claim 24, wherein the phase transfer catalyst is selected from the group consisting of cetyldimethylbenzylammonium chloride, tributylbenzylammonium chloride, trimethyl-benzylammonium chloride, trimethylbenzylammonium iodide, triethylbenzylammonium chloride, triethylbenzylammonium iodide, tetramethylammonium chloride, tetraethylammonium chloride, tetrabutylammonium chloride and mixtures thereof.

35. The process as claimed in claim 24, wherein the condensing is conducted in a water-miscible alcohol and/or ketone.

36. The process as claimed in claim 35, wherein the condensing is conducted in methanol, ethanol, ethyl methyl ketone and/or acetone.

37. The process as claimed in claim 24, wherein the ketone comprises cyclohexanone and the aldehyde comprises formaldehyde.

38. The process as claimed in claim 24, wherein the resin has the following properties:
solubility in alcohols and/or aromatics;
a water content below 0.4% by weight;
a high temperature stability;
a nonvolatiles fraction of more than 99% by weight (1 h, 160° C.);
a glass transition temperature of between 10 and 110° C.; and
a hydroxyl number of between 0 and 300 mg KOH/g.

39. The process as claimed in claim 24, wherein the basic compound comprises a hydroxide of the cations $NH_4$ or Li.

* * * * *